(12) United States Patent  (10) Patent No.: US 9,269,242 B2
Lust, Jr. et al.  (45) Date of Patent: Feb. 23, 2016

(54) ASVVMS=AUTONOMOUS SPACE VEHICLE VIDEO MONITORING SYSTEM

(71) Applicants: Peter Lust, Jr., Camarillo, CA (US); Jens Schnabel, El Cajon, CA (US)

(72) Inventors: Peter Lust, Jr., Camarillo, CA (US); Jens Schnabel, El Cajon, CA (US)

(*) Notice: Subject to any disclaimer, the term of this patent is extended or adjusted under 35 U.S.C. 154(b) by 502 days.

(21) Appl. No.: 13/986,146

(22) Filed: Apr. 5, 2013

(65) Prior Publication Data

US 2014/0300737 A1   Oct. 9, 2014

(51) Int. Cl.
  *G08B 13/196* (2006.01)
  *B64G 3/00* (2006.01)
  *B64G 1/66* (2006.01)
  *B64G 4/00* (2006.01)

(52) U.S. Cl.
  CPC ............ *G08B 13/19623* (2013.01); *B64G 1/66* (2013.01); *B64G 3/00* (2013.01); *B64G 4/00* (2013.01)

(58) Field of Classification Search
  CPC ...... B64G 3/00; B64G 4/00; B64G 2004/005; B64G 1/222; G08B 13/19623; G08B 13/1963; G08B 13/19632; G08B 13/19639
  USPC ................. 348/82, 83, 92, 93, 117, 114, 373; 244/172.6
  See application file for complete search history.

(56) References Cited

U.S. PATENT DOCUMENTS 3,520,496 A * 7/1970 Wuenscher ................. 244/173.1
4,585,388 A * 4/1986 Gossain et al. ............... 414/735
4,661,308 A * 4/1987 Takenaka ....................... 376/245
4,738,583 A * 4/1988 Macconochie et al. ........ 414/735
4,772,175 A * 9/1988 Grimaldi ........................ 414/689
5,065,630 A * 11/1991 Hadcock et al. ................ 73/802
5,241,380 A * 8/1993 Benson et al. ................. 348/143
5,299,764 A * 4/1994 Scott ........................... 244/172.5
5,351,621 A * 10/1994 Tanaka et al. .................... 104/94

(Continued)

FOREIGN PATENT DOCUMENTS

CN     203691532 U  *  7/2014
JP     60190092 A   *  9/1985

(Continued)

OTHER PUBLICATIONS

NASA; "Mobile Servicing System (MSS)"; via archive.org; Apr. 6, 2012; <https://web.archive.org/web/20120406075138/http://www.nasa.gov/externalflash/ISSRG/pdfs/mss.pdf>.*

(Continued)

*Primary Examiner* — John Villecco

(57) ABSTRACT

The autonomous space vehicle video monitoring system is an electrically and mechanically powered camera system for video and audio monitoring of space vehicles. The system allows for autonomous monitoring and implementing corrective actions, providing telemetry and communications to keep the health and wellbeing of a space vehicle. It utilizes a Modular Mounting formed to exact dimensions on any type space vehicle. It has an arm like device to enable complete viewing of the entire 360 degree surface of a space vehicle. The autonomous space vehicle video monitoring system also utilizes rotor joints allowing maximum angle flexibility for viewing the space vehicle. The system has electrically conductive tracks and wheels that have a camera mounted on it with an arm like device in turn enabling 360 degree viewing of the space vehicle surfaces. Delivered in pre-designed sections then fit to the specific structure and assembled on the space vehicle.

1 Claim, 9 Drawing Sheets

(56) References Cited

U.S. PATENT DOCUMENTS

| | | | | |
|---|---|---|---|---|
| 5,406,327 | A * | 4/1995 | Guarnotta | 348/143 |
| 5,511,748 | A * | 4/1996 | Scott | 244/172.5 |
| 5,757,419 | A * | 5/1998 | Qureshi et al. | 348/82 |
| 6,017,000 | A * | 1/2000 | Scott | 244/158.6 |
| 6,189,838 | B1 * | 2/2001 | Nicolette et al. | 246/122 R |
| 6,296,205 | B1 * | 10/2001 | Hanson | B64G 1/1078 244/158.1 |
| 6,384,860 | B1 * | 5/2002 | Tullock | H04N 7/20 348/144 |
| 6,614,468 | B1 * | 9/2003 | Nordmann | 348/143 |
| 6,614,872 | B2 * | 9/2003 | Bueno et al. | 378/58 |
| 7,716,989 | B2 * | 5/2010 | Kollgaard | 73/627 |
| 2004/0026571 | A1 * | 2/2004 | Scott | 244/158 R |
| 2006/0145024 | A1 * | 7/2006 | Kosmas | 244/172.5 |
| 2007/0031217 | A1 * | 2/2007 | Sharma | 414/222.08 |
| 2007/0125910 | A1 * | 6/2007 | Cepollina et al. | 244/172.6 |
| 2008/0062269 | A1 * | 3/2008 | Omer | 348/211.11 |
| 2009/0309986 | A1 * | 12/2009 | Mayer | 348/208.99 |
| 2010/0235037 | A1 * | 9/2010 | Vian | G07C 5/008 701/31.4 |
| 2013/0235185 | A1 * | 9/2013 | Sobotka | 348/125 |
| 2013/0302024 | A1 * | 11/2013 | Eckert et al. | 396/427 |
| 2015/0273691 | A1 * | 10/2015 | Pollack | G01N 35/00623 348/143 |

FOREIGN PATENT DOCUMENTS

| | | | |
|---|---|---|---|
| JP | 10221256 | A * | 8/1998 |
| JP | 2003075350 | A * | 3/2003 |

OTHER PUBLICATIONS

Lieberman, Bruce; "Orbital Inspectors"; Dec. 2014; Air and Space Magazine; <http://www.airspacemag.com/space/orbital-inspectors-180953376/?all>.*

Akin et al.; "Morphbots: Lightweight Modular Self-Reconfigurable Robotics for Space Assembly, Inspection, and Servicing"; Sep. 19-21, 2006; American Institute of Aeronautics and Astronautics, Inc.; pp. 1-11.*

NASA; "The Slowest and Fastest Train in the Universe"; Mar. 24, 2004; <http://www.nasa.gov/missions/shuttle/f_slowtrain.html>.*

Canadian Space Agency; "Uses for Robotic Arm Technology"; Nov. 7, 2011; <http://www.asc-csa.gc.ca/eng/canadarm/robotic.asp>.*

* cited by examiner

ASVVMS=AUTONOMOUS SPACE VEHICLE VIDEO MONITORING SYSTEM

A Satellite and Space Vehicle Monitoring System, using a mounted camera device on a Modular Track System, transferring video, data and Audio to oversee the "Health and Wellbeing" of space vehicles and satellites. It is attached to, mounted and adhered to the Space Vehicle utilizing a unique electrical and mechanical Mounting configurations.

The Autonomous Space Vehicle Video Monitoring System brings the ability of operators and users of the space vehicle and also humans or robots from the inside of the space vehicle to monitor and look and potential areas of concern with the space vehicles exterior structure in the harsh environments of Outer space and deep space.

BACKGROUND

Working in the space industry and coming across many instances of concerns, there seemed to be a need for such a visual self-checking wellbeing satellite and space vehicle monitoring system is controlled from a remote position.

EXAMPLES OF SOME OF THE MATERIALS USED BUT NOT LIMITED TO

Standard aluminum and cast Aluminum for track and arms and mounts
Rubber, compounds and carbon fiber suited for outer space with good outgassing characteristics
Electrically conductive wheels and wiring harnesses
Outgassing free epoxies, rubbers and plastics
Electrical circuit boards, electronic parts, such as diodes, capacitors, resistors, ASICs, analog and digital chips, wiring, Miniature Cameras and optical lens and miniature microphones for audio sounds

DESCRIPTION OF OPERATION

Figure 1:
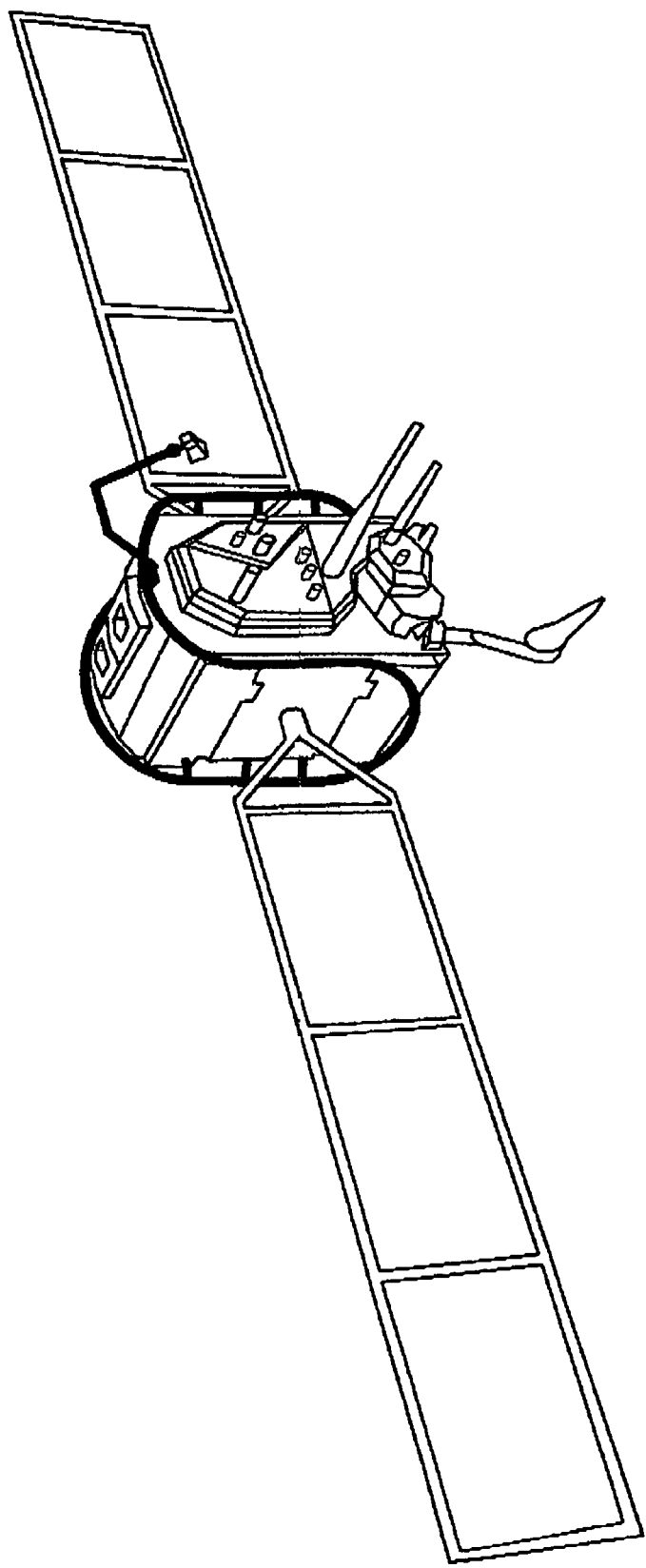
FIG. 1 Artist rendition and illustration of the fully installed of the ASVVMS "Autonomous Space Vehicle Video Monitoring System"

The Autonomous Space Vehicle Video Monitoring System is a robotic Autonomous and semi-autonomous camera system for the purpose of maintaining the Self-Health and Well-Being of the space vehicle it is mounted and designed onto. It is depicted as an overview as a complete system in FIG. 1. It is fixed on the structure of the Space Vehicle and moves on the modular Track System 1 (e.g. FIG. 1, 2) that is custom fit to the space vehicle or satellite configuration (e.g. FIG. 1)

The Operation of the Autonomous Space Vehicle Video Monitoring System is achieved by manipulating from ground either a pre-programmed maneuver, or an autonomous maneuver in order to have the look over and project back to the operators on Earth what is happening with the space vehicle and satellite. Its primary mission being ensuring the health and wellbeing of the space vehicle or satellite it's affixed or flying on.

Figure 2:
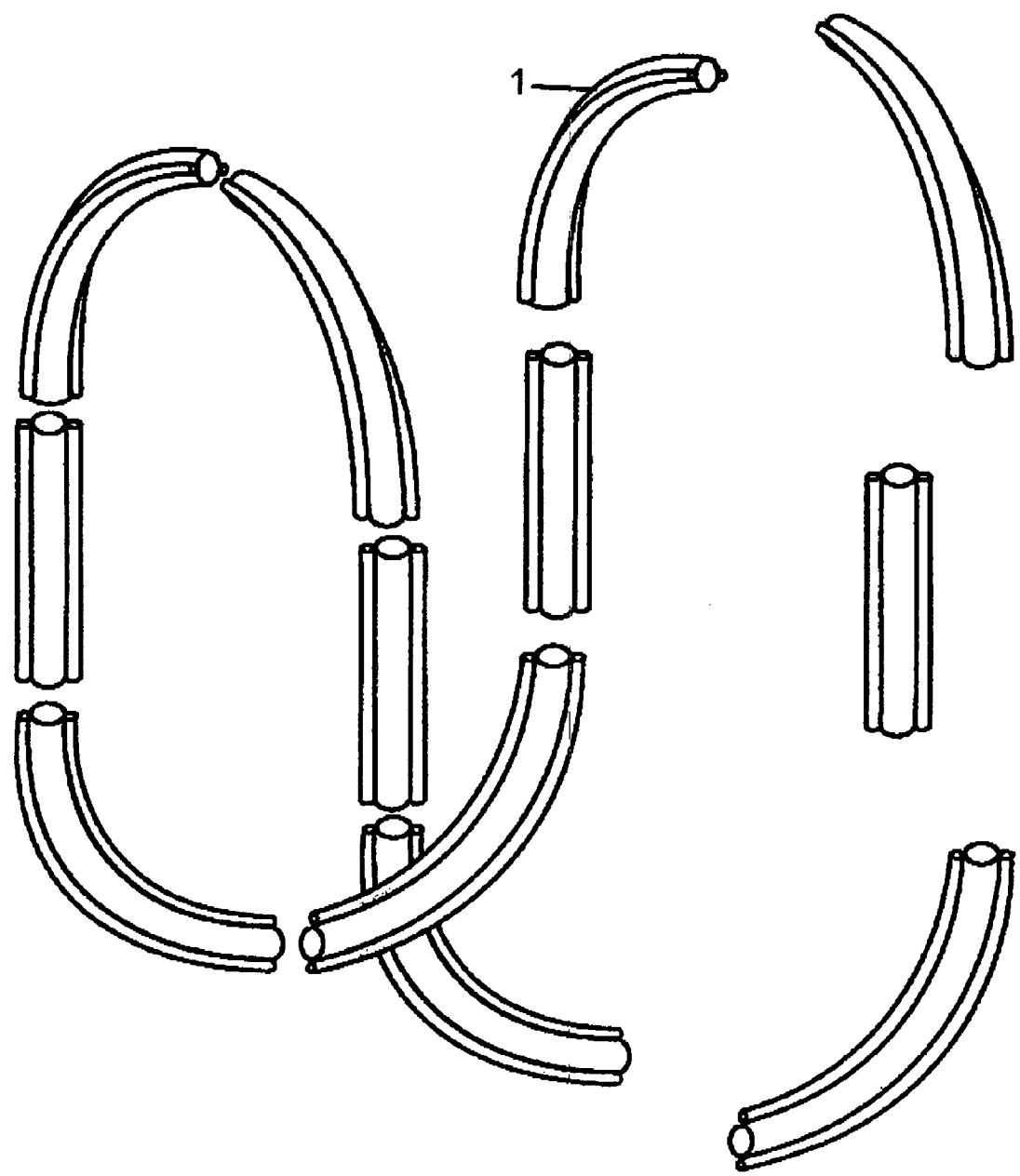
FIG. 2 Drawing of Modular Track System showing Track sections that can be configured and any mechanical layout FIG. 3 Drawing of main Carriage and housing unit mounts with wheels showing the Carriage housing including all controls and circuit boards with the Swivel joint for camera mount, the Driving Wheel, and Stabilizer Wheel that Transfers power to the Carriage unit, and Swivel joints FIG. 4 Drawing of conductive section of the Modular Track System, the tensioning system to ensure conductive contact to rails of the Modular Track System, Outer Rails made of conductive material for electrical power transfer FIG. 5 Drawing showing a single section of the "Modular Track System", Outer Rails made of conductive material for electrical power transfer, Main rail made of non-conductive composite material, The hollow Bracing fixture on bottom of Rail, power cables, feeding electrical power to rails and transmitting and receiving all telemetry from the cameras FIG. 6 Drawing showing electronics locations, and Interior space for circuit boards and control units, Circuit Boards and control FIG. 7 Drawing showing the Fixed Camera, Surveillance Camera, on a Fixed Mount FIG. 8 Drawing showing the rotation and Swivel Joints, Camera extender and telescope arm in open position, Extender Arm Joints, Surveillance Camera, Modular Track System, Carriage Housing FIG. 8A Drawing showing Rotating arm in closed position, rotation and Swivel Joints, Camera extender and telescope arm in open position, with Extender Arm Joints
Figure 3:
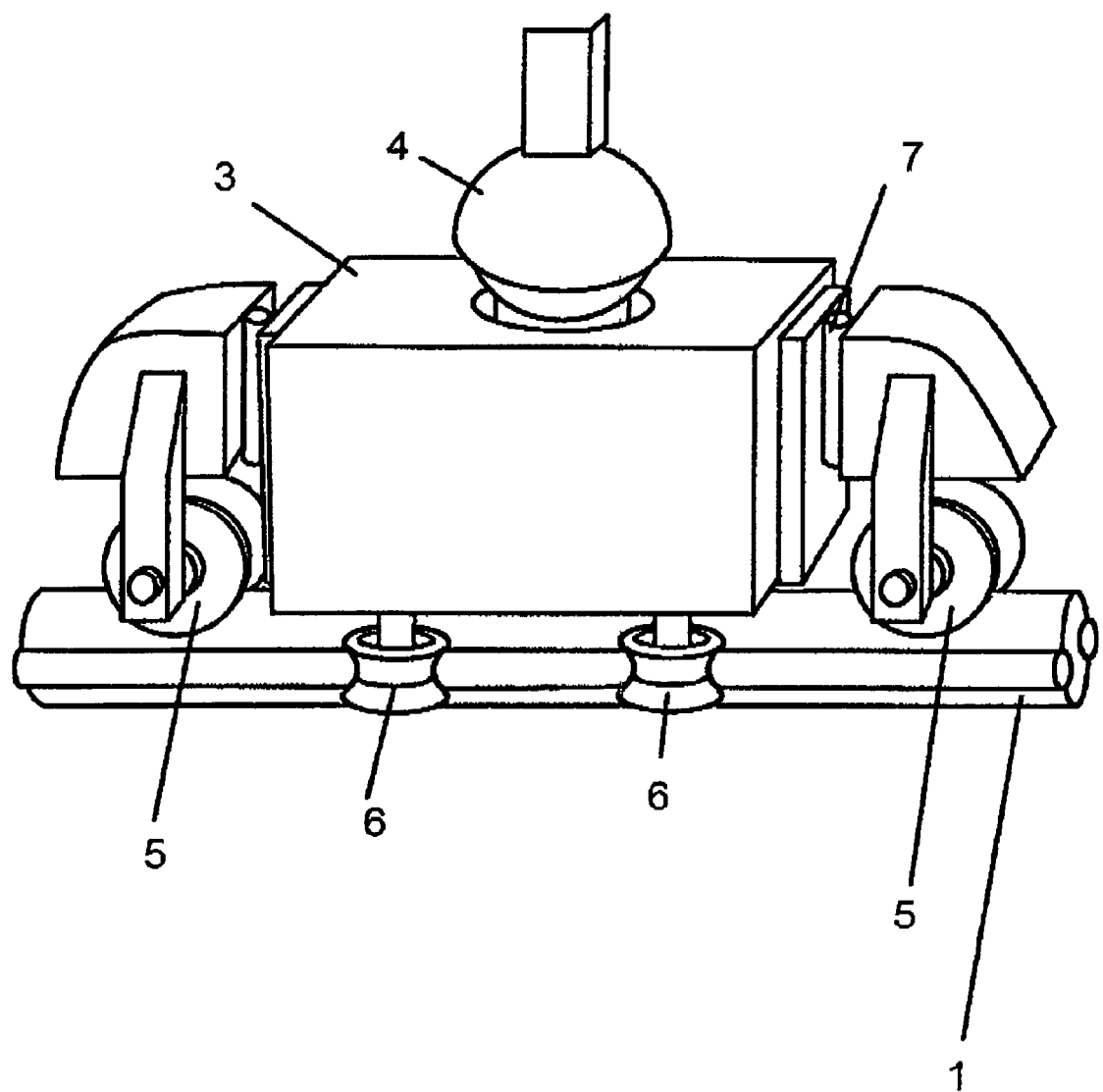
Figure 4:
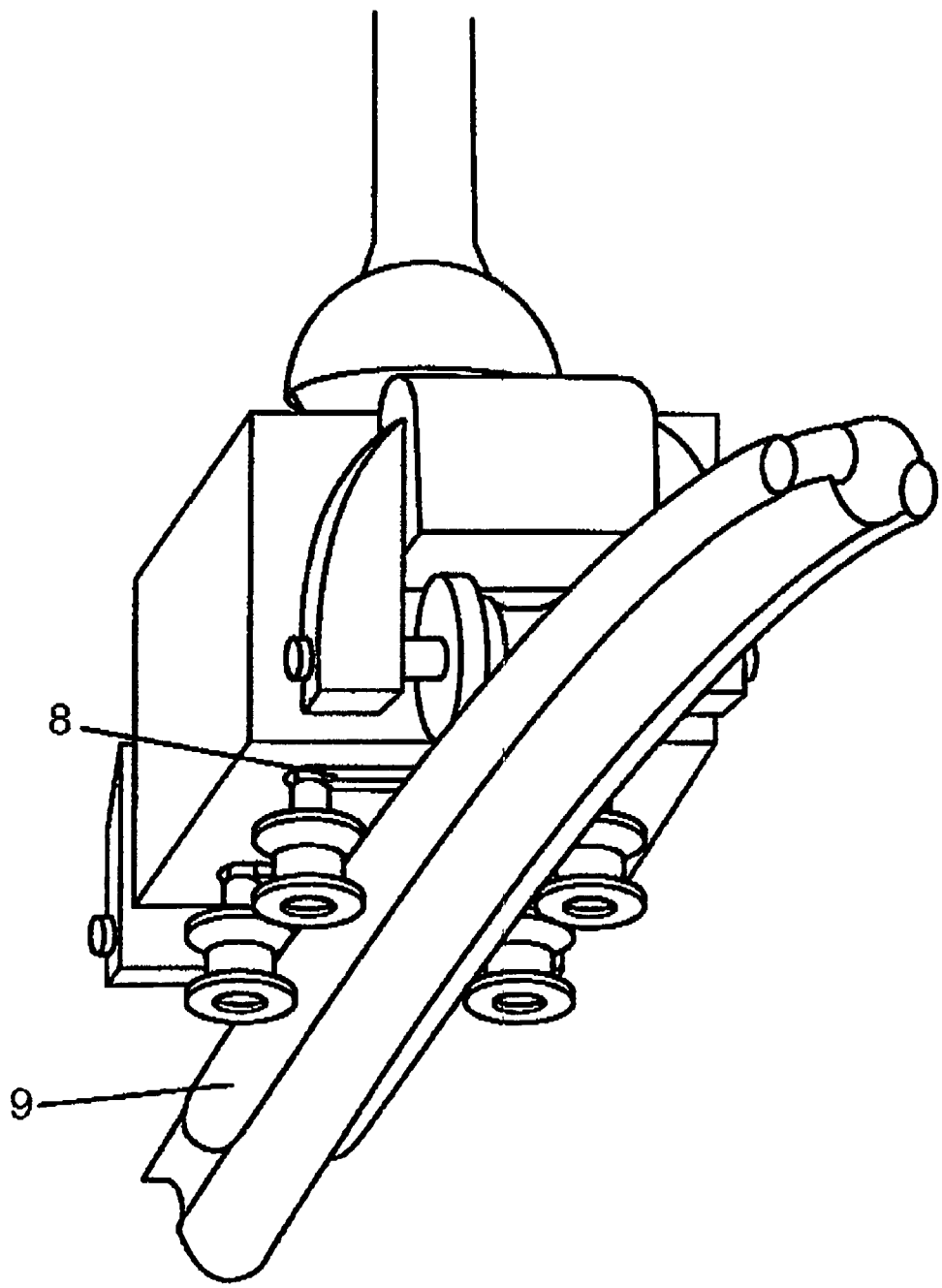
Figure 5:
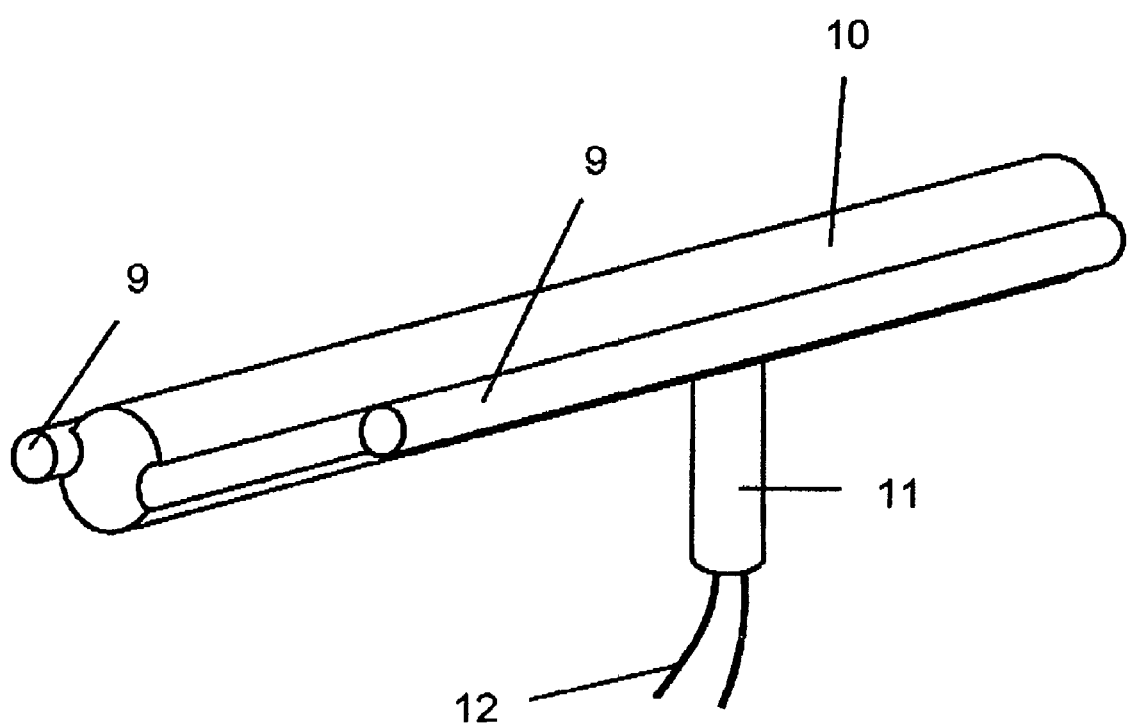
Figure 6:
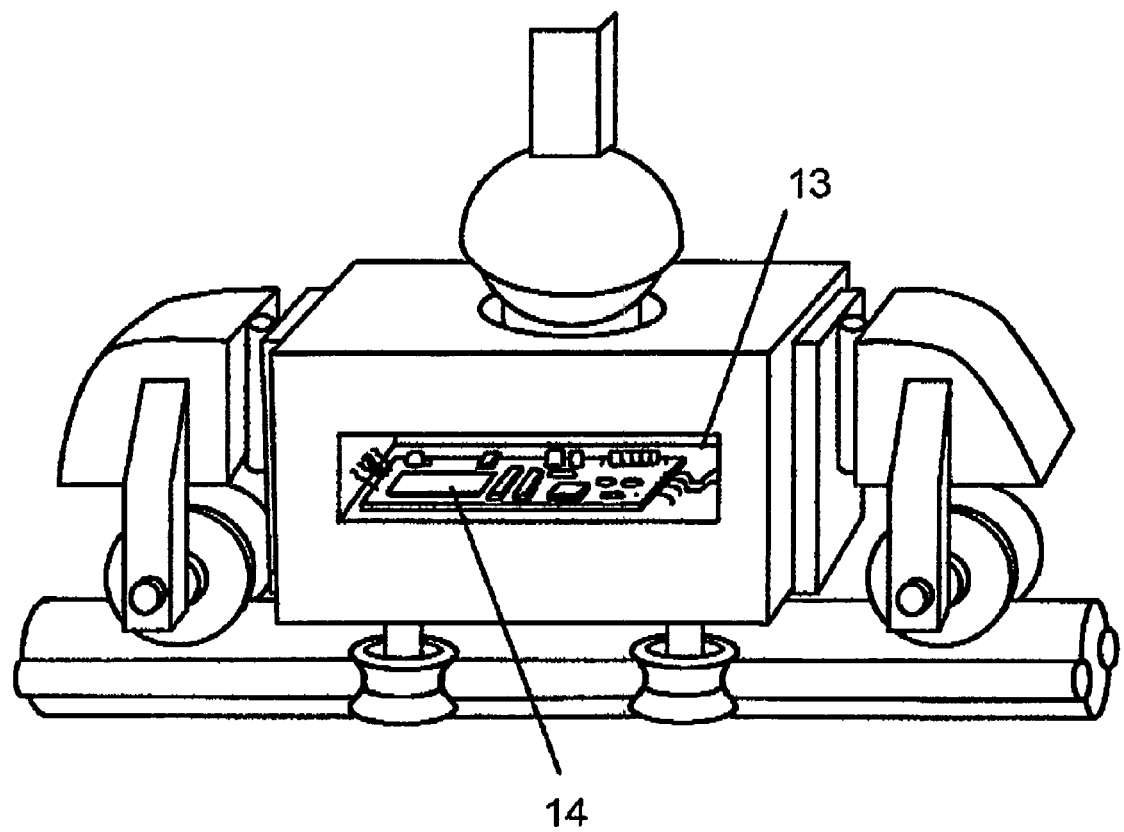

The Autonomous Space Vehicle Video Monitoring System moves along its Modular Track System 1 and looks for faulty areas or correctly functioning areas on the space vehicles and satellites. The Camera part of the system rides along the modular track and performs rotation to view in any 360 degree angle, in turn showing the performance of the space vehicle. By utilizing the Autonomous Space Vehicle Video Monitoring System in (e.g. FIG. 1, 4, 7, 8), the health and wellbeing will be maintained for the life of the space vehicle and satellite The wheels on the bottom of the Carriage Device are called the driving wheels 5 and stabilizer wheels 6 and with the camera running along the Modular Track System (e.g. FIG. 2). on the space vehicle and satellite it is affixed to. The wheels are held solidly in place by force and tension 8 which also provides electrical connectivity through the electrical sections of the tracks 9 (e.g. FIG. 2, 5). Additionally a wire harnesses runs internally 12 (e.g. FIG. 5) The Autonomous Space Vehicle Video Monitoring System moves around the space vehicle on the Modular Track System 1 (e.g. FIG. 2, 3) either autonomously by being pre-programmed, uploaded via telemetry or manually real time operation. All of which is achieved visav the Integrated circuits or ASICS 13, 14 (e.g. FIG. 6) in the Carriage Device 3 (e.g. FIG. 3) and can be commanded from the ground via telemetry signal.

During the movement around the pre-installed Modular Track System 1 (e.g. FIG. 2), or manipulation of the camera head 15 (e.g. FIG. 5, 7, 8) the camera 15 takes live video and audio and streams it live to the ground, or can be stored on it's on board memory 13, then to be viewed. It can also be stored on the on-board computer systems to be downloaded at a later time.

The Autonomous Space Vehicle Video Monitoring System in (e.g. FIG. 3, 7) shows the aluminum, outgassing free composite and aluminum/aluminum alloy materials used for the housing (e.g. FIG. 3) which mounts directly to the tracks of the modular track system 1. It has connectivity via the electrically conductive stabilizer wheels 6 and driving wheels 5 (e.g. FIG. 3), underneath the housing with and is connected via internal wiring 12 (e.g. FIG. 5).

Electrical conductivity is passed from the outer rails of the modular track system 1 with conductive materials as well as internal wiring 12 to the main housing mount in 3 (e.g. FIG. 3, 5, 6) and diverted to the camera itself 15, then sending the communications signals to and from the Autonomous Space Vehicle Video Monitoring System.

The camera 15 returns its video, audio and telemetry signals back though the same systems via the internal wiring 12 and conductive connections 5, 6.

Figure 7:
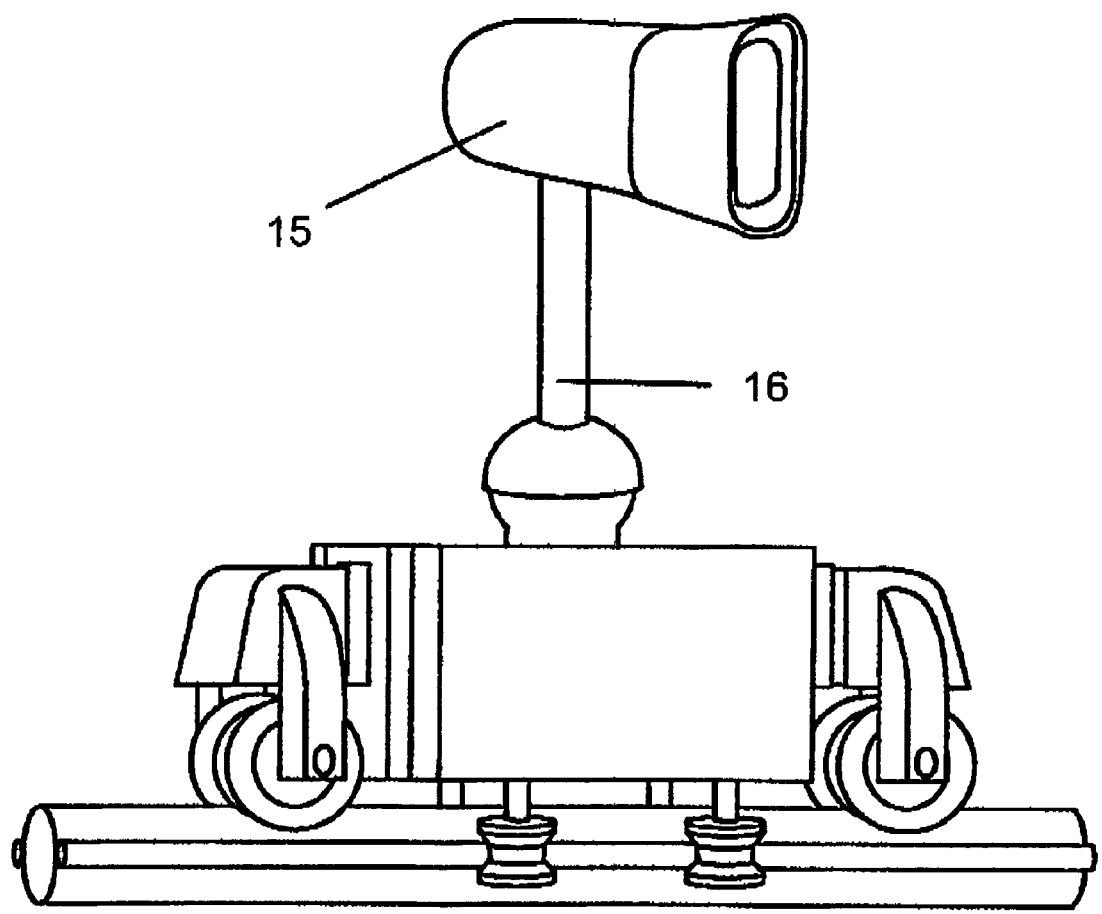

The Autonomous Space Vehicle Video Monitoring System has a fixed mounting approach which has all the same functions, except in that it is fixed to one position on the space vehicle. It has the ability to be manipulated in any direction via the Rotor Joints 4 (e.g. FIG. 3), and also has the specific purpose of monitoring the health and wellbeing of the space vehicle (e.g. FIG. 7).

Figure 8:
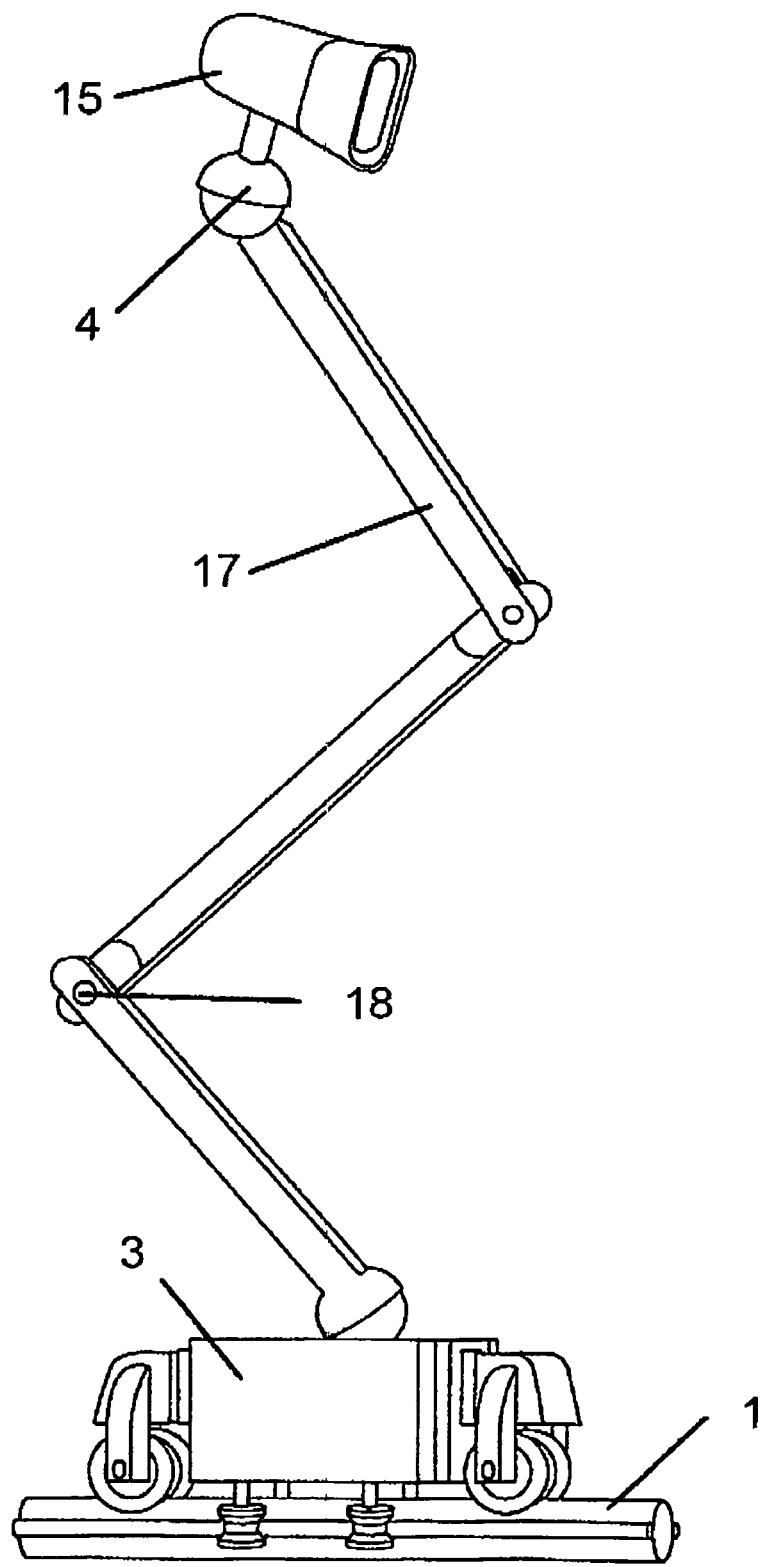
Figure 8A:
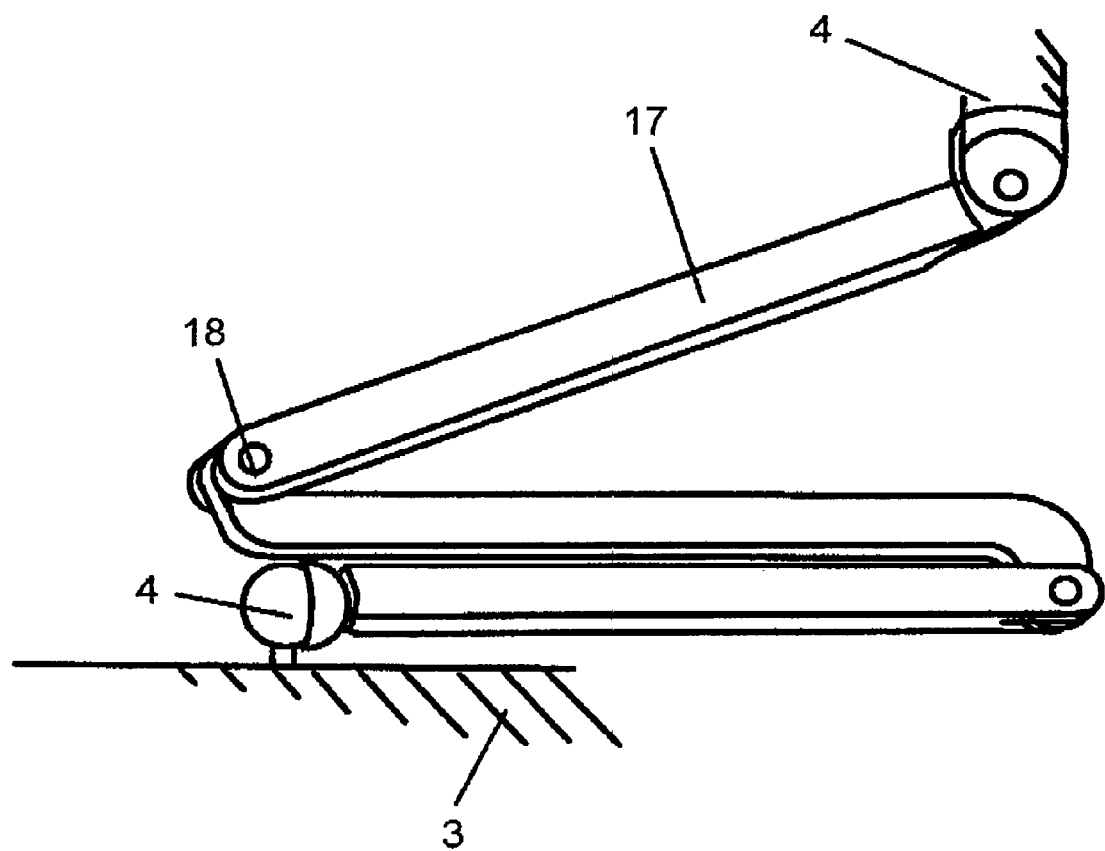

The electrical connections are made from within the extender Arm 17, 18 (e.g. FIG. 5, 8, 8A) up to the camera 15 and back down the Extender Arm 17, (e.g. FIG. 8), fixed connections and then it connects directly the space vehicle internally for telemetry and on board computer systems.

The rotary joints 4 (e.g. FIG. 6, 7, 8) are configured and designed to have a 360 degree moving ability and made from aluminum and outgassing free Plastics, rubber, epoxies and composite type materials that are already approved for space use.

From the internal computer systems on board the space vehicles and satellites, the data from the Autonomous Space Vehicle Video Monitoring System, is sent back to the users, either on board the space vehicle with storage systems 14 or in the air, or on the Earth, Space and ground.

The invention claimed is:

1. An autonomous space vehicle video monitoring system comprising:
    a robotic semi-autonomous camera system for remotely and visually inspecting a space vehicle comprising:
        a carriage and housing unit utilizing conductive wheels and including controls and circuitry;
        an extension arm connected to the carriage and housing unit; and
        a camera mounted on the end of the extension arm; and
    an electrically conductive modular track system directly mounted to the space vehicle for maneuvering the robotic semi-autonomous camera system around the space vehicle, the robotic semi-autonomous camera system traveling on the electrically conductive modular track system;
    wherein where the electrically conductive modular track system is comprised of several subsections of conductive tracks that are directly mounted to the space vehicle and has a wire harness, including wires, running internally for power, communication, video, audio, and telemetry signals;
    wherein the conductive wheels of the carriage and housing unit enable the movement of the robotic semi-autonomous camera system along the electrically conductive modular track system;
    wherein the power and communication signals are transferred from the space vehicle through the electrically conductive modular track system via the conductive wheels to the controls and circuitry of the carriage and housing unit, and then to the camera; and video signals, audio signals, and telemetry signals are returned;
    wherein the controls and circuitry in the carriage and housing unit control the extension arm with the camera at its end to view and monitor the health and wellbeing of the space vehicle; and
    wherein the camera which sits on the arm has at least one rotation joint that allows the camera to rotate in any 360 degree position using the at least one rotation joint which is located on the extension arm.

* * * * *